United States Patent

[11] 3,578,020

| [72] | Inventors | Jerry E. Rochte |
| | | Seal Beach; |
| | | Larry S. McDavid, Fullerton, Calif. |
| [21] | Appl. No. | 754,012 |
| [22] | Filed | Aug. 20, 1968 |
| [45] | Patented | May 11, 1971 |
| [73] | Assignee | Beckman Instruments, Inc. |

[54] VALVE ASSEMBLY
3 Claims, 4 Drawing Figs.

[52] U.S. Cl. ................................................. 137/512, 137/525
[51] Int. Cl. ..................................................... F16k 15/14
[50] Field of Search ........................................... 137/493, 493.8, 512, 525, ; 103/228 (pt.)

[56] References Cited
UNITED STATES PATENTS
| 1,352,036 | 9/1920 | Smith | 137/512 |
| 1,413,568 | 4/1922 | Bjornstad | 137/525X |
| 2,313,284 | 3/1943 | Valentine | 137/525X |
| 2,707,074 | 4/1955 | Tussey | 137/525X |
| 3,027,849 | 4/1963 | Zillman et al. | 137/525X |
| 3,451,422 | 6/1969 | Chorkey | 137/525 |

FOREIGN PATENTS
| 1,325,051 | 3/1963 | France | |

*Primary Examiner*—Robert G. Nilson
*Attorneys*—Thomas L. Peterson and Robert J. Steinmeyer ABSTRACT: A check-type valve assembly in which an annular channel is formed in a valve body. A port is formed in the inner surface of the channel and is closed by an elastic band which is positioned under tension in the channel so as to bear tightly against the inner surface thereof. The elastic band functions as a valve element for controlling the flow of fluid through passages communicating with said port and the annular channel.

PATENTED MAY 11 1971    3,578,020

INVENTORS
JERRY E. ROCHTE
LARRY S. McDAVID
BY Thomas L. Peterson
ATTORNEY

VALVE ASSEMBLY

BACKGROUND OF THE INVENTION

This invention relates generally to a valve assembly and, more particularly, to a check-type valve assembly for use in precision pumping systems.

Various types of valve assemblies have been in use for years in conjunction with a piston and cylinder to provide a fluid pumping system. Such a pumping system has many applications, one of which is chemical analyses wherein it is desired to deliver known, precise quantities of liquids, such as samples or reagents, to an analytical instrument for determining particular constituents in the samples. By far the simplest type of valve utilized in a pumping system of the type mentioned above has been some form of a double check valve assembly utilizing floating balls or the like as the valve elements of such assembly. For a precision pumping system such as is required for use in analytical systems, this type of a valve assembly has been unsatisfactory since, due to the mechanical design of the assembly, some backflow of fluid is generally required to positively close the ball valves of the assembly and usually a considerable pressure differential is required across the valves to open them.

As a consequence, precision pumping systems have also utilized valves which incorporate sliding face valve elements which are opened and closed at the proper time by the mechanism which drives the piston of the pump. This not only makes the pump more complex but also requires a valve assembly which is somewhat more complex than the ball check valve assembly. Thus, this type of valve is substantially more expensive than the ball check valve assembly discussed above and also has not been found to be entirely suitable for delivery of known and precise quantities of liquids.

What is needed, therefore, is a check-type valve assembly of simple construction, which is inexpensive to manufacture, requires a minimum number of parts, and is not subject to the above-mentioned pressure requirements of ball check valve assemblies.

SUMMARY OF THE INVENTION

The principal object of the present invention is to provide a simple and inexpensive check-type valve assembly which is particularly suited for use in pumping systems for delivering known and precise quantities of liquids.

According to the principal aspect of the present invention, there is provided a check-type valve assembly in which an annular channel is formed in a valve body. A port is formed in the inner surface of the channel and is closed by an elastic band which is positioned under tension in the channel so as to bear tightly against the inner surface thereof. The elastic band functions as a valve element for controlling the flow of fluid through passages communicating with said port and the annular channel. It can be appreciated that by the use of an elastic band as the valve element, a very inexpensive valve element is provided which does not require a high-pressure differential to open or a back pressure to close the same inasmuch as the band, due to its inherent elasticity, closes by itself upon the removal of fluid pressure from the underside of the band. Thus, the valve overcomes the problems of the conventional ball check valve of requiring back pressure to close the valve. Moreover, due to the simplicity and small number of parts of the valve assembly of the present invention, it lends itself to very inexpensive manufacture and assembly.

Other objects, aspects and advantages of the invention will become apparent from the following description taken in connection with the accompanying drawing.

DESCRIPTION OF THE PREFERRED EMBODIMENTS

Figure 1:
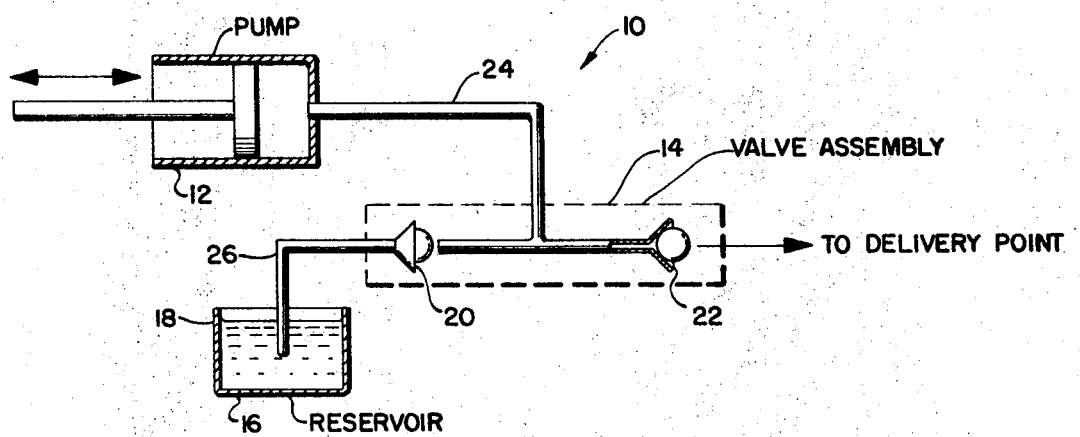
FIG. 1 is a schematic illustration of a pumping system incorporating a ball check valve assembly of the type which has been utilized in the past.

Referring now to the drawing in detail, there is shown in FIG. 1 a schematic illustration of a pumping system, generally designated 10, for conveying known quantities of liquid to a delivery point. The system includes a pump 12, a double check valve assembly 14, and a reservoir 16 containing the liquid 18 which is desired to be delivered to a delivery point, which may be an analytical instrument, for example. The valve assembly is illustrated as being of the type utilized in the past incorporating a pair of ball check valves 20 and 22, which are connected to the pump 12 by means of a conduit 24. The check valve 20 is in communication with the liquid 18 and reservoir 16 by means of a conduit 26.

As can be appreciated, during the suction stroke of the pump 12, liquid is drawn through the conduit 26 and check valve 20 into the conduit 24, while the check valve 22 will remain closed. During the pressure or delivery stroke of the pump 12, the pressure of the liquid within conduit 24 will open the check valve 22 to deliver the liquid to a delivery point, and the pressure of the liquid within the conduit will simultaneously close the check valve 20.

The ball check valve assembly 14 requires a back flow or back pressure of liquid to positively close the valves 20 and 22 and requires a considerable pressure differential across the valves to open them. We have invented a double check-type valve assembly which functions generally in the same manner as the valve assembly 14 illustrated in FIG. 1, but overcomes the disadvantages in operation of the valve assembly 14 and of sliding face valve assemblies and is less complex in construction and, thus, less expensive.

Figure 2:
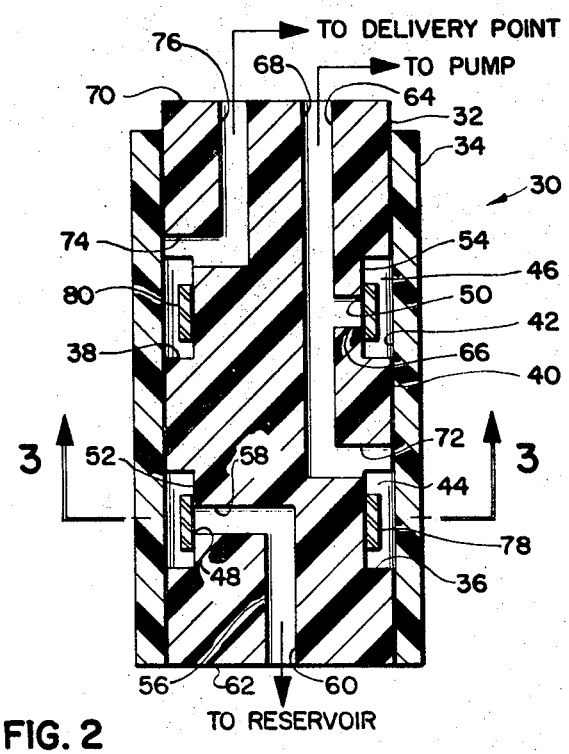
FIG. 2 is a longitudinal sectional view of a preferred form of a valve assembly in accordance with the present invention, which may be advantageously utilized in the pumping system disclosed in FIG. 1.
Figure 3:
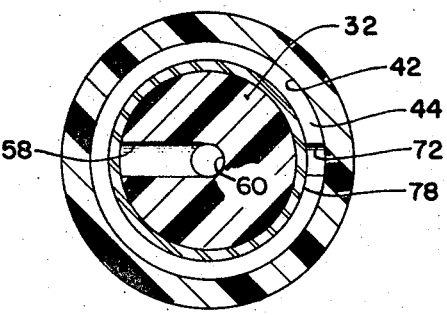
FIG. 3 is a sectional view taken along line 3-3 of FIG. 2.

One embodiment of the valve of the present invention, generally designated 30, is illustrated in FIGS. 2 and 3. The valve body of the assembly includes an inner cylindrical part 32 and an outer cylindrical sleeve 34 which surrounds the inner part in sealing relationship therewith. A pair of axially spaced annular grooves 36 and 38 are formed in the inner part 32 and open at its outer surface 40. These grooves and the inner surface 42 of the sleeve 34 define two annular closed channels 44 and 46.

Valve ports 48 and 50 are provided in the inner surface 52 and 54 of the grooves 36 and 38, respectively. These ports are positioned generally equidistant from the sides of the grooves. The port 48 is in communication with the exterior of the part 32 by means of a passage 56. This passage includes a radially extending portion 58 which terminates in the port 48 and an axially extending portion 60 which opens at the end 62 of part 32. The port 50 is in communication with the exterior of the valve body 32 by means of a passage 64. This passage includes a radially extending portion 66 that terminates in the port 50 and an axially extending portion 68 which opens at the opposite end 70 of the valve part 32.

The channel 44 is in communication with the exterior of the valve body by means of a radially extending passage 72 and the axially extending portion 68 of passage 64. As seen in the drawing, the passage 72 opens at the side of groove 36 and extends to the outer surface 40 of the inner part 32. Thus, the port 50 is in flow communication with the channel 44 by means of the common axially extending passage 68. The channel 46 is in communication with the exterior of the valve body by means of a radially inwardly extending passage 74, which opens at the side of the groove 38 and extends to the outer surface 40 of the part 32, and by an axially extending portion 76 which opens at the end 70 of part 32.

The valve elements utilized in the assembly 30 of the present invention are in the form of annular elastic bands 78 and 80 which are located in the respective grooves 36 and 38.

These bands have a sufficiently small diameter so as to be under tension and thus tightly sealed against the inner surfaces 52 and 54 of the grooves 36 and 38, respectively, and have a sufficient width so as to close the ports 48 and 50. The tension of the bands is such as to close and seal the ports without the requirement of any pressure upon the outer surfaces of the bands. It is noted that the outer surfaces of the bands are spaced from the outer surfaces of the channels 44 and 46, that is, the inner surface 42 of sleeve 34, so that the bands are capable of moving radially outwardly upon the application of fluid pressure to the ports 48 and 50.

When the valve assembly 30 is desired to be utilized for delivery of analytical reagents or samples to an analytical instrument for analysis of the samples, it is preferred that the parts 32 and 34 of the assembly be formed of an inert and relatively soft plastic material such as polypropylene or Penton, a chlorinated polyether. It is also preferred that the bands 78 and 80 be formed of a soft chemically inert elastomer such as silicone or fluorosilicone rubber.

In utilizing the valve assembly 30 of the present invention in a pumping system as illustrated in FIG. 1, the passage 60 is connected to the reservoir 16, the passage 68 is connected to the pump 12 while the passage 68 is connected to the delivery point. In operation of the valve assembly, during the suction stroke of the pump, the reduction in pressure in the channel 44 causes the band 78 to lift away from the port 48 thus permitting the liquid 18 in the reservoir 16 to pass through the passage 56, port 48, channel 44, and passage 64 into the conduit 24 of the pumping system. During this time, the port 50 is closed due to the inherent elasticity of the band 80. During the pressure or delivery stroke of the pump, the band 78 will close the port 48 and the pressure of the liquid acting upon the inner surface of band 80 shifts the latter away from the port 50 thus providing flow communication between the passage 68 and channel 46. The liquid then flows through the channel 46 and to the delivery point via the passages 74 and 76. At the end of the pressure stroke of the pump, the band 80 will again close upon the port 50 so that the pumping process may be repeated. It has been found that the valve assembly of the present invention permits the delivery of known and precise quantities of liquids for as long as one year without problems of leakage or failure.

Figure 4:
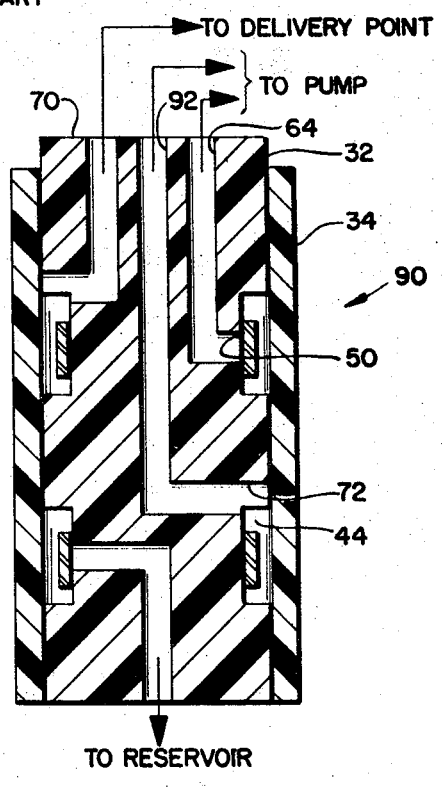
FIG. 4 is a longitudinal section view of a modified form of the valve assembly of the present invention.

It can be appreciated that the function of the two valves in the assembly 32 provided by the bands 78 and 80 which cooperate with the ports 48 and 50, respectively, is interdependent due to the connection of the valves via the conduit 68 that connects the port 50 to the channel 44. Under some circumstances it might be desirable to operate the two valves independently. For this purpose, there is illustrated in FIG. 4 a modified form of the invention, generally designated 90, which is identical to the assembly 30 except that a separate axially extending passage 92 is connected to the radially extending passage portion 72 to provide direct flow communication between the channel 44 and the end 70 of the valve part 32. In this embodiment, both the passage 64, which is connected to port 50, and the passage 92 would be connected to the pump 12 and the valve assembly will function in the same manner as the assembly 30 except that the two valve functions of the assembly will operate independently.

It can be readily appreciated that manufacture of the valve of the present invention is very simple inasmuch as only two of the annular grooves need be formed in the part 32 and the radially and axially extending passages may be easily bored in the part 32 to provide the appropriate flow of liquid through the valve. The bands 78 and 80 are simply stretched over the ends of the body 32 to be assembled within the channels 44 and 46. Thereafter, the sleeve 44, which has a slight interference fit with the inner part 32, is forced onto said part to close the channels 44 and 46. The assembly can obviously be readily disassembled for replacing the bands 78 and 80 if such is required after extended use of the assembly.

It can be appreciated that the present invention is not limited to the particular configuration of the valve assembly illustrated in FIGS. 2—4, for it is apparent to those skilled in the art that the novel features and advantages of the invention may be attained by utilizing substantially different structural arrangements embodying annular channels with elastic bands positioned therein for closing ports opening in the inner surfaces of such channels. For example, two annular channels could be formed in the side-by-side relationship in the face of a flat plate and such channels could be closed by a second plate which is secured in sealing relationship on top of the first plate.

Although we have herein shown and described out invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures and devices.

We claim:

1. A double check valve assembly comprising:
    a valve body formed with a pair of spaced continuous channels therein each including inner and outer surfaces;
    a port in the inner surface of each of said channels;
    an elastic band in each channel bearing against said inner surface to close the port therein and being spaced from said outer surface of said channel;
    said valve body including a cylindrical inner part and an outer sleeve surrounding said inner part in sealing relationship therewith;
    each of said channels being provided by an annular groove formed in said inner part and opening at the cylindrical surface thereof whereby the outer surfaces of said channels are provided by annular portions of the inner surface of said sleeve;
    passage means communicating said ports and said channels to the exterior of said body, said passage means including first and second passages having portions extending radially inwardly from the the respective ports of said channels and third and fourth passages having portions extending radially inwardly from the sides of said channels;
    each of said passages also including axially extending portions communicating said radially extending portions with at least one end of said inner part; and
    said first and third passage having a common axially extending portion.

2. A double check valve assembly comprising:
    a valve body formed with a pair of spaced continuous channels therein each including inner and outer surfaces;
    a port in the inner surface of each of said channels;
    an elastic band in each channel bearing against said inner surface to close the port therein and being spaced from said outer surface of said channel;
    said valve body including a cylindrical inner part and an outer sleeve surrounding said inner part in sealing relationship therewith;
    each of said channels being provided by an annular groove formed in said inner part and opening at the cylindrical surface thereof whereby the outer surfaces of said channels are provided by annular portions of the inner surface of said sleeve;
    passage means communicating said ports and said channels to the exterior of said body, said passage means including first and second passages having portions extending radially inwardly from the respective ports of said channels and third and fourth passages having portions extending radially inwardly from the sides of said channels;
    each of said passages also including axially extending portions communicating said radially extending portions with at least one end of said inner part; and
    said passages being without communication with each other in said body except through said ports.

3. A double check valve assembly comprising:
    a valve body including a cylindrical inner part and a cylindrical outer sleeve surrounding said inner part;

a pair of concentric axially spaced annular grooves formed in said inner part and opening at the outer cylindrical surface thereof providing a pair of channels the outer surfaces of which are defined by annular portions of the inner surface of said sleeve;

said sleeve and said inner part being in sealing relationship with each other along their entire extent except at said channels whereby said channels are without communication with each other between said sleeve and inner part;

a port in the inner surface of each of said channels;

an elastic band in each channel bearing against said inner surface to close the port therein and being spaced from said outer surface of said channel; and passage means in said inner part communicating said ports and said channels to the exterior of said inner part of said body, said passage means including first and second passages having portions extending radially inwardly from the respective ports of said channels and third and fourth passages opening into the respective channels remote from said bands therein.